US008485056B2

(12) United States Patent
Ross

(10) Patent No.: US 8,485,056 B2
(45) Date of Patent: Jul. 16, 2013

(54) DUAL CLUTCH MULTI-SPEED TRANSMISSION

(75) Inventor: Craig S. Ross, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 918 days.

(21) Appl. No.: 12/616,009

(22) Filed: Nov. 10, 2009

(65) Prior Publication Data

US 2011/0107860 A1 May 12, 2011

(51) Int. Cl.
*F16H 3/08* (2006.01)

(52) U.S. Cl.
USPC ............................................................ 74/330

(58) Field of Classification Search
USPC .................................... 74/330, 331, 335, 340
See application file for complete search history.

(56) References Cited

U.S. PATENT DOCUMENTS

| | | | |
|---|---|---|---|
| RE33,336 E | 9/1990 | Bainbridge et al. | |
| 5,234,087 A | 8/1993 | Jurgens et al. | |
| 5,890,392 A * | 4/1999 | Ludanek et al. | 74/331 |
| 6,401,558 B1 | 6/2002 | Caramagno | |
| 6,460,425 B1 | 10/2002 | Bowen | |
| 6,978,691 B2 * | 12/2005 | Katakura | 74/331 |
| 7,040,186 B2 * | 5/2006 | Pollak | 74/330 |
| 7,083,545 B2 | 8/2006 | Ibamoto et al. | |
| 7,246,536 B2 * | 7/2007 | Baldwin | 74/340 |
| 7,272,986 B2 | 9/2007 | Janson | |
| 7,272,987 B2 | 9/2007 | Hughes | |
| 7,421,919 B2 * | 9/2008 | Gumpoltsberger et al. | 74/330 |
| 7,469,609 B2 * | 12/2008 | Baldwin | 74/330 |
| 7,472,617 B2 * | 1/2009 | Nicklass | 74/340 |
| 7,597,020 B2 * | 10/2009 | Baldwin | 74/336 R |
| 7,765,886 B2 * | 8/2010 | Hori et al. | 74/343 |
| 7,886,626 B2 * | 2/2011 | Bjorck et al. | 74/330 |
| 8,117,932 B2 * | 2/2012 | Bjorck et al. | 74/329 |
| 2004/0154420 A1 * | 8/2004 | Katakura | 74/335 |
| 2005/0241424 A1 | 11/2005 | Baldascini et al. | |
| 2006/0021456 A1 | 2/2006 | Hughes | |
| 2006/0123940 A1 | 6/2006 | Janson et al. | |
| 2006/0130601 A1 | 6/2006 | Hughes | |
| 2007/0074593 A1 | 4/2007 | Mizuno et al. | |
| 2007/0214904 A1 * | 9/2007 | Ohnemus | 74/330 |
| 2008/0134818 A1 * | 6/2008 | Gitt | 74/330 |
| 2009/0145253 A1 * | 6/2009 | Katakura et al. | 74/335 |
| 2010/0147106 A1 | 6/2010 | Ross et al. | |

FOREIGN PATENT DOCUMENTS

DE 3812359 7/1989

* cited by examiner

*Primary Examiner* — Troy Chambers
*Assistant Examiner* — Michael Gonzalez

(57) ABSTRACT

A transmission includes an input member, an output transfer gear, first and second shaft members, a countershaft or layshaft, a reverse shaft member, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output transfer gear.

25 Claims, 2 Drawing Sheets

DUAL CLUTCH MULTI-SPEED TRANSMISSION

TECHNICAL FIELD

The present disclosure relates to transmissions and more particularly to a compact, dual clutch multiple speed transmission having two axes and a dedicated reverse shaft.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission having an input member, an output transfer gear, first and second shaft members, a countershaft, a reverse member, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output transfer gear.

In another embodiment of the present invention a transmission includes an input member, an output member, a first, second, third, fourth, and fifth gear set. The first gear set has a first gear and a second gear, the second gear set has a first gear and a second gear, the third gear set has a first gear and a second gear, the fourth gear set has a first gear and a second gear, the fifth gear set has a first gear, a second gear and a third gear. A first interconnecting member is continuously connected to the first gear of the third and selectively connectable with the first gear of the first and second gear sets. A second interconnecting member is continuously connected with the first gear of the fourth and fifth gear sets and wherein the first interconnecting member is concentric with the second interconnecting member. A reverse shaft is spaced apart from and parallel with the first and second interconnecting members. The second gear of the fifth gear set is selectively connectable to the reverse shaft. A reverse gear is continuously connected to the reverse shaft. A transfer gear is co-planar with and intermeshing with the reverse gear. A countershaft is continuously connected to the output member, the second gear of the second gear set, the second gear of the third gear set and the transfer gear and selectively connectable with the second gear of the first gear set, the second gear of the fourth gear set and third gear of the fifth gear set. A dual clutch assembly is selectively engageable to interconnect the input member with at least one of the first interconnecting member and the second interconnecting member and three synchronizer assemblies for selectively coupling at least one of the gears of the first, second, third, fourth and fifth gear sets with at least one of the first interconnecting member, the second interconnecting member, the reverse shaft, and the countershaft. The dual clutch assembly and three synchronizer assemblies are selectively engageable in combinations of at least two to establish at least five forward speed ratios and at least one reverse speed ratio between the input member and the output member.

In another aspect of the present invention, the transmission includes five co-planar gear sets.

In yet another aspect of the present invention, the transmission includes three synchronizer assemblies.

In yet another aspect of the present invention, the three synchronizer assemblies include one one-way synchronizer and two two-way synchronizers.

In yet another aspect of the present invention, the transmission is operable to provide at least five forward speed ratios.

In still another aspect of the present invention, the dual clutch assembly includes a first clutch for selectively connecting the input member with the first interconnecting member and a second clutch for selectively connecting the input member with the second interconnecting member In still another aspect of the present invention, a first of the three synchronizer assemblies selectively connects the second gear of the fifth gear set to the reverse shaft to establish a reverse gear ratio.

In still another aspect of the present invention, a second of the three synchronizer assemblies selectively connects one of the first gear of the first gear set and first gear of the second gear set to the first interconnecting member.

In still another aspect of the present invention, a second of the three synchronizer assemblies selectively connects the first gear of the first gear set to the first interconnecting member to establish a third gear ratio.

In still another aspect of the present invention, a third of the three synchronizer assemblies selectively connects one of the second gear of the fourth gear set and the third gear of the fifth gear set to the countershaft In still another aspect of the present invention, the fifth gear set is adjacent the dual clutch assembly and the reverse gear and the transfer gear are adjacent a wall opposite the dual clutch.

In still another aspect of the present invention, the output member is connected to the countershaft at a location between the third gear of the fifth gear set and an end bearing that rotatably supports an end of the countershaft.

In still another aspect of the present invention, the reverse gear and the transfer gear are adjacent a wall adjacent the dual clutch.

In still another aspect of the present invention, a one-way clutch is disposed between the second gear of the third gear set and the countershaft for selectively connecting the second gear of the third gear set to the countershaft.

The above features and advantages and other features and advantages of the present invention are readily apparent from the following detailed description of the best modes for carrying out the invention when taken in connection with the accompanying drawings.

DESCRIPTION

Figure 1:
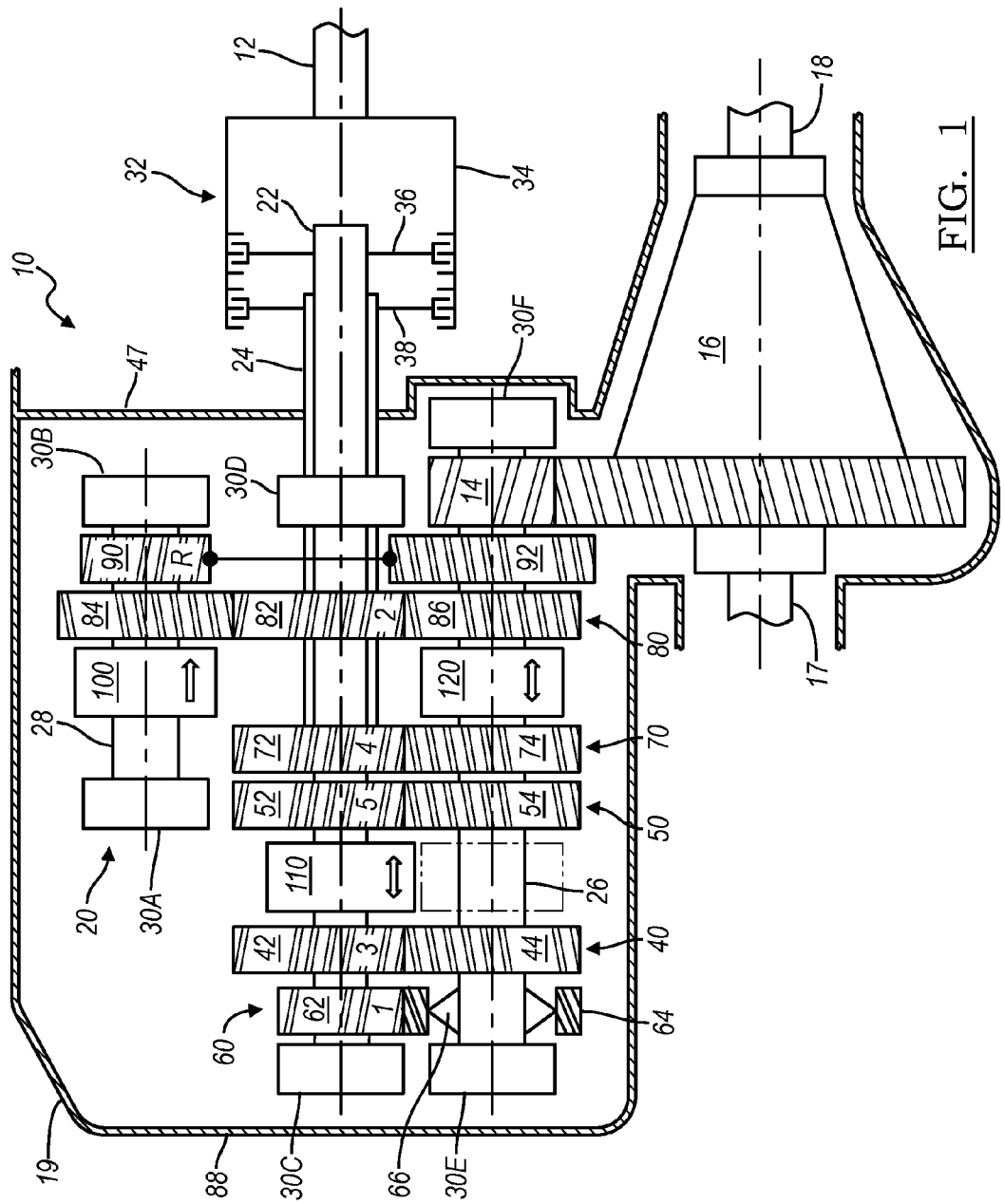
FIG. 1 is a side cross-sectional view of an embodiment of a transmission in accordance with the present invention.

Referring to the drawings, wherein like reference numbers refer to like components, in FIG. 1 a multiple speed transmission is generally indicated by reference number 10. The transmission 10 includes an input member 12 and an output member or transfer gear 14. In the present embodiment, the input member 12 is a shaft and the transfer gear 14 is a gear, however, those skilled in the art will appreciate that the input member 12 may be components other than shafts and the output member 14 may be a component, such as a shaft, other than a gear.

The input member 12 is continuously connected with an engine (not shown) or other torque producing machine to provide a driving torque to input member 12. The output member or transfer gear 14 rotatably drives a final drive assembly 16. The final drive assembly 16 transfers torque delivered by transfer gear 14 to first and second side axles 17, 18, and on to road wheels (not shown) coupled to side axles 17, 18.

The transmission 10 includes a housing 19 that at least partially encloses a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first shaft or interconnecting member 22, a second shaft or interconnecting member 24, a countershaft or layshaft 26, and a reverse shaft or member 28. The second shaft or member 24 is a sleeve shaft that is concentric with and overlies the first shaft or member 22. The layshaft 26 and the reverse shaft member 28 are each spaced apart from and parallel with the first and second shaft members 22, 24. The first and second shafts define a first axis of rotation and the layshaft 26 defines a second axis of rotation. Shaft members 22, 24, layshaft 26 and reverse shaft member 28 are rotatably supported by bearings 30a, 30b, 30c, 30d, 30e and 30f.

A dual clutch assembly 32 is connected between the input member 12 and the first and second shaft members 22, 24. The dual clutch assembly 32 includes a clutch housing 34 connected for common rotation with the input member 12. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon that interact to form a friction clutch. The clutch element 36 is connected for common rotation with the first interconnecting member 22 and the clutch element 38 is connected for common rotation with the second interconnecting member 24. Thus, selective engagement of clutch element 36 with the clutch housing 34 connects the input member 12 for common rotation with the first shaft member 22. Selective engagement of clutch element 38 with the clutch housing 34 connects the input member 12 for common rotation with the second shaft member 24.

The gearing arrangement 20 also includes a plurality of co-planar, intermeshing gear sets 40, 50, 60, 70 and 80. Co-planar gear set 40 includes gear 42 and gear 44. Gear 42 is selectively connectable for common rotation with the first shaft member 22 and intermeshes with gear 44. Gear 44 is connected for common rotation with the layshaft 26. It should be appreciated that gear 42 may be a separate gear structure fixed to the first shaft member 22 or gear teeth/splines formed on an outer surface of the first shaft member 22 without departing from the scope of the present invention.

Co-planar gear set 50 includes gear 52 and gear 54. Gear 52 is selectively connectable for common rotation with the first shaft member 22 and intermeshes with gear 54. Gear 54 is connected for common rotation with the layshaft 26. Gear set 50 is located adjacent gear set 40.

Co-planar gear set 60 includes gear 62 and gear 64. Gear 62 is connected for common rotation with the first shaft member 22 and intermeshes with gear 64. Gear 64 is selectively connectable for common rotation with layshaft 26. More specifically, gear 64 is mounted to a one way clutch 66 that selectively couples gear 64 to layshaft 26. Gear set 60 is disposed between an end wall 88 of transmission housing 19 and gear set 40.

Co-planar gear set 70 includes gear 72 and gear 74. Gear 72 is connected for common rotation with the second shaft member 24 and intermeshes with gear 74. Gear 74 is selectively connectable for common rotation with the layshaft 26. Gear set 70 is located adjacent gear set 50.

Co-planar gear set 80 includes gear 82, gear 84 and gear 86. Gear 82 is connected for common rotation with the second shaft member 24 and intermeshes with gear 84. Gear 84 is selectively connectable for common rotation with the reverse shaft 28. Gear 86 is selectively connectable for common rotation with the layshaft 26 and intermeshes with gear 82. Gear set 80 is positioned between gear set 70 and an end wall 47 of the transmission housing 19.

Reverse gear 90 is connected for common rotation with the reverse shaft member 28 and intermeshes with transfer gear 92. Transfer gear 92 is connected for common rotation with the layshaft 26. Reverse gear 90 and transfer gear 92 is located between gear set 80 and end wall 47.

Preferably, the output member or gear 14 is connected for common rotation with the layshaft 26. The output member 14 is positioned on layshaft 26 between the transfer gear 92 and bearing 30f.

The transmission 10 further includes a plurality of selectively engageable synchronizer assemblies 100, 110 and 120. Synchronizer 100 is a single sided synchronizer that generally include a shift fork (not shown) that is bi-directionally translated by an actuator (not shown) into one engaged position and a neutral or disengaged position. For example, synchronizer 100 is selectively engageable to connect gear 84 with the reverse shaft 28 for common rotation therewith. In a preferred embodiment, synchronizer 100 has only one actuator.

Synchronizers 110 and 120 are double sided synchronizers and generally include a shift fork (not shown) that is bi-directionally translated by an actuator (not shown) into at least two engaged positions and a neutral or disengaged position. For example, synchronizer 110 is selectively engageable to connect gear 42 with the first shaft member 22 for common rotation therewith and is selectively engageable to connect gear 52 with the first shaft member 22 for common rotation therewith. Synchronizer 120 is selectively engageable to connect gear 74 with the layshaft member 26 for common rotation therewith and is selectively engageable to connect gear 86 with the layshaft member 26 for common rotation therewith.

The transmission 10 is capable of transmitting torque from the input shaft 12 to the transfer gear 14 in at least five forward torque ratios and at least one reverse torque ratio. Each of the forward torque ratios and the reverse torque ratio is attained by selective engagement of the dual clutch assembly 32 and one or more of the synchronizer assemblies 100, 110 and 120.

Those skilled in the art will readily understand that a different speed ratio is associated with each torque ratio.

It should be appreciated that each individual gear set 40, 50, 60, 70, 80 and gears 90 and 92 provide one or more forward and/or reverse gear ratios upon selective engagement of the synchronizer assemblies 100, 110 and 120 and that which synchronizer and which gear set are associated with which forward or reverse speed ratio may vary without departing from the scope of the present invention.

For example, to establish the reverse torque ratio, clutch element 38 is engaged to couple the input member 12 with the second shaft member 24 and synchronizer 100 is engaged to connect gear 84 to the reverse shaft member 28. Input torque from the input shaft 12 is transferred through the dual clutch assembly 32 to the second shaft member 24, through gear 82 to gear 84, through gear 84 to the reverse shaft member 28, through reverse shaft member 28 to reverse gear 90, from gear 90 to transfer gear 92, and through the layshaft 26 to the output member or gear 14.

To establish a first forward torque ratio (i.e. a 1st gear ratio), clutch element 36 is engaged to couple the input member 12 with the first shaft member 22. Input torque from the input member 12 is transferred through the dual clutch assembly 32 to the first shaft member 22 and to gear 62. Gear 62 transfers torque to the one-way clutch and gear 64 which transfers the torque to the layshaft 26 and onto the output member or gear 14.

To establish a second forward torque ratio (i.e. a 2nd gear ratio), clutch element 38 is engaged to couple the input member 12 to the second shaft member 24. Synchronizer 120 is activated to couple gear 86 to the layshaft member 26. Accordingly, input torque from the input member 12 is transferred through the dual clutch assembly 32 to the second shaft member 24, through gear 82 to gear 86, and then through the layshaft 26 to the output member or gear 14.

To establish a third forward torque ratio (i.e. a 3rd gear ratio), clutch element 36 is engaged to couple the input member 12 to the first shaft member 22. Synchronizer 110 is activated to couple gear 42 to the first shaft member 22. Thus, input torque from the input member 12 is transferred through the dual clutch assembly 32 to the first shaft member 22, through synchronizer 110 to gear 42 and gear 44, and through the layshaft 26 to output member or gear 14.

To establish a fourth forward torque ratio (i.e. a 4th gear ratio), clutch element 38 is engaged to couple the input member 12 to the second shaft member 24. Input torque from the input member 12 is transferred through the dual clutch assembly 32 to the second shaft member 24 and to gear 72. Synchronizer 120 is activated to couple gear 74 to the layshaft member 26. Thus, torque is transferred to layshaft 26 through gear 74, and then through the layshaft 26 to the output member or gear 14.

To establish a fifth forward torque ratio (i.e. a 5th gear ratio), clutch element 36 is engaged to couple the input member 12 to the first shaft member 22 and synchronizer 120 is engaged to couple gear 52 to the first shaft member 22. Input torque from the input member 12 is transferred through the dual clutch assembly 32 to the first shaft member 22, through synchronizer 120 to gear 52 and gear 54, and from gear 54 through the layshaft 26 to the output member or gear 14.

Again, it should be appreciated that which of the gear sets 40, 50, 60, 70 and 80 are associated with which forward and reverse torque ratio may be changed from the above example without departing from the scope of the present invention.

The present invention contemplates that a variety of torque ratios (i.e., the ratio of torque of the transfer gear 14 to the input member 12) are achievable through the selection of tooth counts of the gears of the transmission 10. This arrangement provides the opportunity to achieve reduced transmission length in comparison with other transmissions.

Figure 2:
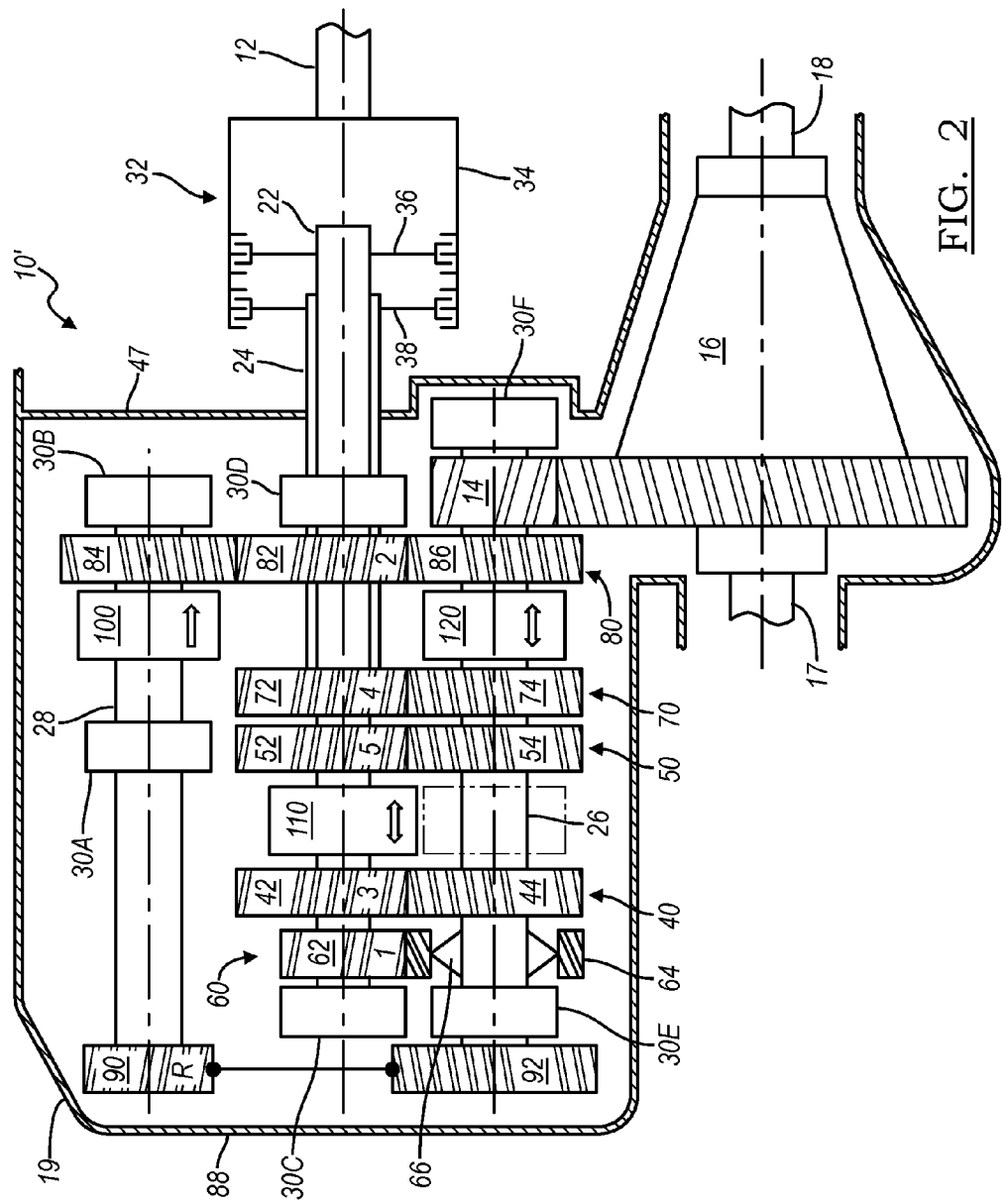
FIG. 2 is a side cross-sectional view of another embodiment of a transmission in accordance with the present invention

Referring now to FIG. 2, another embodiment of a transmission is provided in accordance with the present invention and generally designated by reference number 10'. Transmission 10' includes the same dual clutch 32, first and second shafts or interconnecting members 22, 24, countershaft or layshaft 26, reverse shaft 28 and co-planar gear sets 40, 50, 60, 70, and 80 and synchronizers 100, 110 and 120. However, the instant transmission 10' embodiment differs from transmission 10 in the placement of reverse gear 90 and transfer gear 92 on reverse shaft member 28 and countershaft or layshaft 26, respectively. As in the previous embodiment, reverse gear 90 is connected for common rotation with the reverse shaft member 28 and intermeshes with transfer gear 92. Reverse shaft 28' extends axially farther than reverse shaft 28 of transmission 10 in order to position reverse gear 90 in a co-planar relationship with transfer gear 92 on countershaft or layshaft 26. Transfer gear 92 is connected for common rotation with the countershaft or layshaft 26. Reverse gear 90 and transfer gear 92 are positioned between gear set 60 and end wall 88.

Further, transmissions 10 and 10' allow for an alternate location of synchronizer 110. Alternatively, synchronizer 110 is positionable on countershaft or layshaft 26 instead of on first interconnecting shaft 22. In this alternate embodiment, gears 42 and 52 are fixed to their respective shafts and gears 44 and 54 are selectively fixed for common rotation with countershaft or layshaft 26.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   an input member;
   an output member;
   a first, second, third, fourth, and fifth gear set, wherein the first gear set has a first gear and a second gear, the second gear set has a first gear and a second gear, the third gear set has a first gear and a second gear, the fourth gear set has a first gear and a second gear, the fifth gear set has a first gear, a second gear and a third gear;
   a first interconnecting member continuously connected to the first gear of the third and selectively connectable with the first gear of the first and second gear sets;
   a second interconnecting member continuously connected with the first gear of the fourth and fifth gear sets and wherein the first interconnecting member is concentric with the second interconnecting member;
   a reverse shaft spaced apart from and parallel with the first and second interconnecting members, and wherein the second gear of the fifth gear set is selectively connectable to the reverse shaft;
   a reverse gear continuously connected to the reverse shaft;
   a transfer gear is co-planar with and intermeshing with the reverse gear;
   a countershaft continuously connected to the output member, the second gear of the second gear set, the second gear of the third gear set and the transfer gear and selectively connectable with the second gear of the first gear set, the second gear of the fourth gear set and third gear of the fifth gear set;

a dual clutch assembly selectively engageable to interconnect the input member with at least one of the first interconnecting member and the second interconnecting member; and three synchronizer assemblies for selectively connecting at least one of the gears of the first, second, third, fourth and fifth gear sets with at least one of the first interconnecting member, the second interconnecting member, the reverse shaft, and the countershaft, and wherein the dual clutch assembly and three synchronizer assemblies are selectively engageable in combinations of at least one clutch of the dual clutch assembly and at least one of the three synchronizer assemblies to establish at least five forward speed ratios and at least one reverse speed ratio between the input member and the output member.

2. The transmission of claim 1 wherein the dual clutch assembly includes a first clutch for selectively connecting the input member with the first interconnecting member and a second clutch for selectively connecting the input member with the second interconnecting member.

3. The transmission of claim 1 wherein the first gears of the first, second, third and fourth gear sets intermesh with the second gears of the first, second, third and fourth gear sets, and wherein the first gear of the fifth gear set intermeshes with the second gear and the third gear of the fifth gear set.

4. The transmission of claim 1 wherein a first of the three synchronizer assemblies selectively connects the second gear of the fifth gear set to the reverse shaft to establish a reverse gear ratio.

5. The transmission of claim 1 wherein the fifth gear set is adjacent the dual clutch assembly and the reverse gear and the transfer gear are adjacent a wall opposite the dual clutch.

6. The transmission of claim 1 wherein the output member is connected to the countershaft at a location between the third gear of the fifth gear set and an end bearing that rotatably supports an end of the countershaft.

7. The transmission of claim 1 wherein the reverse gear and the transfer gear are adjacent a wall adjacent the dual clutch.

8. The transmission of claim 1 further comprising a one-way clutch disposed between the second gear of the third gear set and the countershaft for selectively connecting the second gear of the third gear set to the countershaft.

9. The transmission of claim 1 wherein a third of the three synchronizer assemblies selectively connects one of the second gear of the fourth gear set and the third gear of the fifth gear set to the countershaft.

10. The transmission of claim 9 wherein a third of the three synchronizer assemblies selectively connects the second gear of the fourth gear set to the countershaft to establish a fourth gear ratio.

11. The transmission of claim 9 wherein a third of the three synchronizer assemblies selectively connects the third gear of the fifth gear set to the countershaft to establish a second gear ratio.

12. The transmission of claim 1 wherein a second of the three synchronizer assemblies selectively connects one of the first gear of the first gear set and first gear of the second gear set to the first interconnecting member.

13. The transmission of claim 12 wherein a second of the three synchronizer assemblies selectively connects the first gear of the first gear set to the first interconnecting member to establish a third gear ratio.

14. The transmission of claim 13 wherein a second of the three synchronizer assemblies selectively connects the first gear of the second gear set to the first interconnecting member to establish a fifth gear ratio.

15. A transmission comprising:
an input member;
an output member;
a first, second, third, fourth, and fifth gear set, wherein the first gear set has a first gear and a second gear, the second gear set has a first gear and a second gear, the third gear set has a first gear and a second gear, the fourth gear set has a first gear and a second gear, the fifth gear set has a first gear, a second gear and a third gear;

a first interconnecting member continuously connected to the first gear of the third and selectively connectable with the first gear of the first and second gear sets;

a second interconnecting member continuously connected with the first gear of the fourth and fifth gear sets and wherein the first interconnecting member is concentric with the second interconnecting member;

a reverse shaft spaced apart from and parallel with the first and second interconnecting members, and wherein the second gear of the fifth gear set is selectively connectable to the reverse shaft;

a reverse gear continuously connected to the reverse shaft;

a transfer gear is co-planar with and intermeshing with the reverse gear;

a countershaft continuously connected to the output member, the second gear of the second gear set, the second gear of the third gear set and the transfer gear and selectively connectable with the second gear of the first gear set, the second gear of the fourth gear set and third gear of the fifth gear set;

a one-way clutch disposed between the second gear of the third gear set and the countershaft for selectively connecting the second gear of the third gear set to the countershaft;

a dual clutch assembly selectively engageable to interconnect the input member with at least one of the first interconnecting member and the second interconnecting member; and three synchronizer assemblies for selectively connecting at least one of the gears of the first, second, third, fourth and fifth gear sets with at least one of the first interconnecting member, the second interconnecting member, the reverse shaft, and the countershaft, and wherein the dual clutch assembly and three synchronizer assemblies are selectively engageable in combinations of at least one clutch of the dual clutch assembly and at least one of the three synchronizer assemblies to establish at least five forward speed ratios and at least one reverse speed ratio between the input member and the output member.

16. The transmission of claim 15 wherein the dual clutch assembly includes a first clutch for selectively connecting the input member with the first interconnecting member and a second clutch for selectively connecting the input member with the second interconnecting member.

17. The transmission of claim 15 wherein the fifth gear set is adjacent the dual clutch assembly and the reverse gear and the transfer gear are adjacent a wall opposite the dual clutch.

18. The transmission of claim 15 wherein the first gears of the first, second, third and fourth gear sets intermesh with the second gears of the first, second, third and fourth gear sets, and wherein the first gear of the fifth gear set intermeshes with the second gear and the third gear of the fifth gear set.

19. The transmission of claim 18 wherein a first of the three synchronizer assemblies selectively connects the second gear of the fifth gear set to the reverse shaft to establish a reverse gear ratio.

20. The transmission of claim 18 wherein a second of the three synchronizer assemblies selectively connects one of the first gear of the first gear set and first gear of the second gear set to the first interconnecting member.

21. The transmission of claim 20 wherein a second of the three synchronizer assemblies selectively connects the first gear of the first gear set to the first interconnecting member to establish a third gear ratio.

22. The transmission of claim 20 wherein a second of the three synchronizer assemblies selectively connects the first gear of the second gear set to the first interconnecting member to establish a fifth gear ratio.

23. The transmission of claim 18 wherein a third of the three synchronizer assemblies selectively connects one of the second gear of the fourth gear set and the third gear of the fifth gear set to the countershaft.

24. The transmission of claim 23 wherein a third of the three synchronizer assemblies selectively connects the second gear of the fourth gear set to the countershaft to establish a fourth gear ratio.

25. The transmission of claim 23 wherein a third of the three synchronizer assemblies selectively connects the third gear of the fifth gear set to the countershaft to establish a second gear ratio.

* * * * *